United States Patent [19]

Fernyhough et al.

[11] Patent Number: 5,935,508

[45] Date of Patent: *Aug. 10, 1999

[54] FIBRE-REINFORCED COMPOSITIONS AND METHODS FOR THEIR PRODUCTION

[75] Inventors: Alan Fernyhough, Hampshire; Michael Fryars, Surrey, both of United Kingdom; Sebastien Paul Yohann Castellier, Chamtoce sur Loire, France

[73] Assignee: Kabushiki Kaisha Kobe Seiko Sho, Kobe, Japan

[*] Notice: This patent is subject to a terminal disclaimer.

[21] Appl. No.: 08/903,344

[22] Filed: Jul. 30, 1997

[30] Foreign Application Priority Data

Jul. 30, 1996 [GB] United Kingdom .................... 9615995

[51] Int. Cl.$^6$ .............................. B29B 9/06; B29C 35/10; B29C 47/06
[52] U.S. Cl. .......................... 264/495; 264/136; 264/140; 264/171.13; 264/211
[58] Field of Search ..................................... 264/136, 140, 264/143, 171.13, 211, 477, 495

[56] References Cited

U.S. PATENT DOCUMENTS

| | | | |
|---|---|---|---|
| 3,702,356 | 11/1972 | Hall ................................ | 264/171.13 X |
| 4,037,011 | 7/1977 | Hattori et al. . | |
| 4,169,186 | 9/1979 | Tazaki et al. . | |
| 5,520,867 | 5/1996 | Shirai et al. ............................. | 264/140 |
| 5,639,410 | 6/1997 | Amaike et al. ......................... | 264/136 |
| 5,700,417 | 12/1997 | Fernyhough et al. .................. | 264/477 |

FOREIGN PATENT DOCUMENTS

| | | |
|---|---|---|
| 0 114 345 | 8/1984 | European Pat. Off. . |
| 0 415 517 | 3/1991 | European Pat. Off. . |
| WO 96/00648 | 1/1996 | WIPO . |

Primary Examiner—Leo B. Tentoni
Attorney, Agent, or Firm—Oblon, Spivak, McClelland, Maier & Neustadt, P.C.

[57] ABSTRACT

A process for the manufacture of fibre-reinforced intermediates useful in thermoplastic processing methods, including compounding and moulding, which comprises impregnating continuous fibres with a resin composition comprising at least one radiation-polymerizable component, exposing the impregnated fibres to radiation to effect polymerization of such component, and cutting the product to form thermoplastically processible intermediates which, optionally, may be mixed with other polymer and/or additives during mixing or moulding. A process described as above but in which the uncut radiation polymerized fibre-resin product is blended with a least one polymer and/or additive in a continuous mixer, such as an extruder; and the resulting blended product is cut to form thermoplastically processible intermediates, such as mouldable pellets.

20 Claims, 1 Drawing Sheet

SIMPLE EXAMPLE OF APPARATUS SUITABLE FOR THE INVENTION

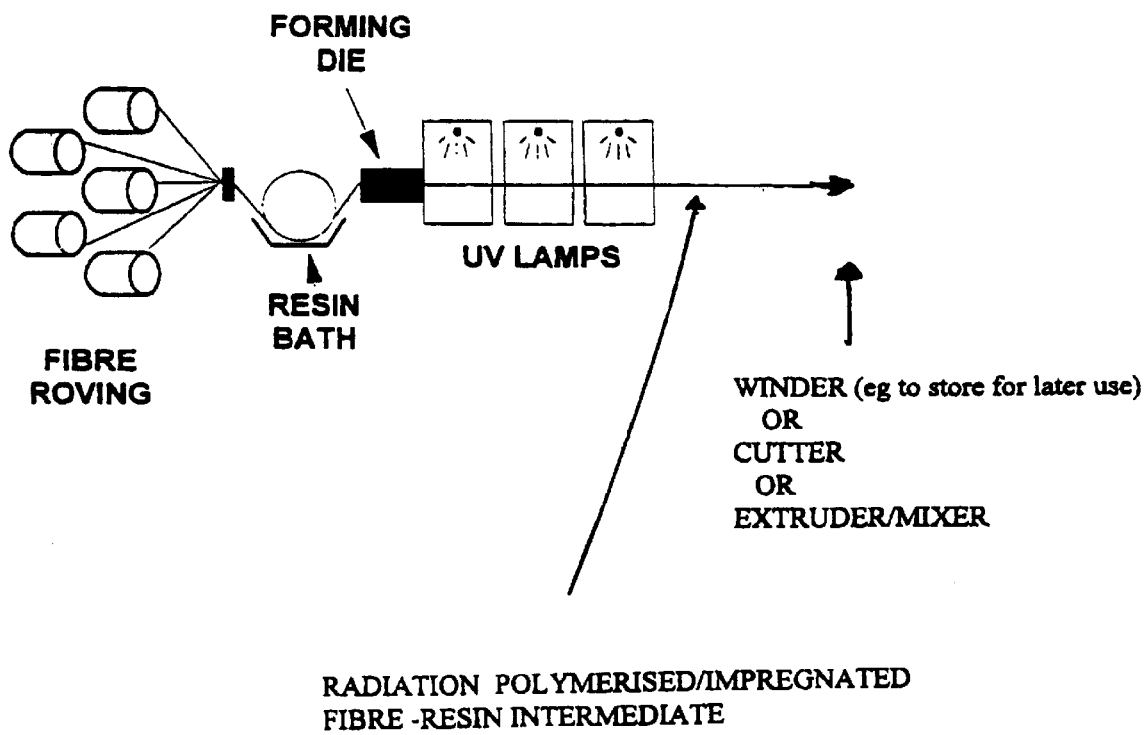
SIMPLE EXAMPLE OF APPARATUS SUITABLE FOR THE INVENTION

FIBRE-REINFORCED COMPOSITIONS AND METHODS FOR THEIR PRODUCTION

BACKGROUND OF THE INVENTION

1. Field of the Invention

This invention relates to methods which include the use of radiation polymerisation for the manufacture of fibre-resin intermediates which are suitable for use as, or use in, mouldable fibre reinforced polymer compounds.

2. Description of the Related Art

One of the most common approaches to the production of reinforced thermoplastic composite intermediates for subsequent moulding processes, such as injection moulding, is extrusion compounding. Chopped fibres and additives are usually dispersed within a polymer melt via a screw extruder to produce a continuous strand or other shape which is then subsequently cooled or solidified and chopped to produce a moulding compound such as a granule or pellet. This process has the disadvantage of only producing short fibre lengths in the mouldable intermediate product since fibre feedstock is already chopped (typically 3–6 mm) and the conventional extrusion process is known to impart significant fibre breakage and hence reduce fibre lengths further. In addition, high temperatures are needed to melt the polymers to a suitable viscosity for effective fibre wetting or impregnation. Good control of fibre-polymer adhesion is not always easily achievable. Furthermore the process is not well suited to efficient incorporation of certain additives which may be desirable eg liquids (which are inconvenient to feed into an extruder) and/or materials for controlling the fibre-polymer interface, which would usually be dispersed randomly within the fibre-polymer mixture (in the extruder) rather than deliberately located on or near to the fibre. Introduction of a coating around fibres, or other routes to influence the fibre-resin interphase region, in fibre-polymer composites is not convenient, unless carried out by the fibre manufacturers.

There are potential advantages, such as an improved balance of mechanical properties (eg toughness or impact resistance and strength/modulus) in achieving longer fibre lengths in a final moulded component Longer fibres in the mouldable intermediate can often translate into longer retained fibre lengths in the final moulded component. In addition, good fibre impregnation and/or adhesion, or some control over bonding between the fibres and polymer in the fibre—polymer interphase region is often desired for property optimisations.

Several routes to the manufacture of long fibre reinforced thermoplastic moulding compounds are known and a key issue is the achievement of good impregnation of the continuous fibres with the thermoplastic polymer. Such inpregnated continuous fibres are usually chopped to a desired length. Example processes for impregnation of continuous fibre reinforcement include hot-melt impregnation, solvent based impregnation, fluidised bed/powder impregnation, and comingling of thermoplastic fibres with reinforcing fibres. Processes are known in which a fibre reinforced composite structure is produced by pulling continuous fibres through a resin bath containing a low viscosity liquid formulation to impregnate the fibres. The formulation is subsequently cured by heat in a heated forming die to a thermoset product. As such this product is not usually subsequently mouldable or thermoplastically processable. This is the well known technology of pultrusion as applied to thermoset composite products.

Variations on this process which essentially involve a hot-melt impregnation approach ('melt-pultrusion') have been disclosed for the production of thermoplastic composites, see for example EP 056 703, U.S. Pat. No. 5,213,889 and related patents and also the article by S. J. Bowen & P. H. Johnson in Engineering Plastics Vol 4, No 3, pp 188–197 (1991).

In such melt-pultrusion processes thermoplastic melts are used for fibre impregnation and this often necessitates the use of high temperatures, even for many low molecular weight polymers, and can place some limitations on the maximum production speeds that can be used for achievement of good wetting of the fibres or filaments. In some cases the thermoplastic melt is delivered to a resin bath or impregnation head via a screw extruder. Thus, in such cases, continuous fibres are passed through an impregnation head attached to the output of an extruder or other equipment from which molten polymer can feed.

Although such processes do produce a long fibre reinforced thermoplastic intermediate which is subsequently mouldable there are inconveniences associated with the use of hot, molten thermoplastics including handling and degradation of polymer at the high temperatures required for good fibre wetting. In many cases relatively high polymer melt viscosities are experienced which limit line speed. Particular care is required to maintain a sufficiently low viscosity melt and careful control of heating and cooling effects is necessary since melt viscosities may become too high for good impregnation. The design, including temperature control, of spreaders or rollers or pins or other aids to maximise fibre impregnation can be particularly important when hot molten polymers are used for impregnation.

The use of a pultrusion process in the production of mouldable composite intermediates is also described in articles by H. Ishida and D. A. Zimmermann in Proceedings of the 47th Annual Conference, Composites Institute, The Society of Plastics Industry Inc, Feb. 3–6 1992, in paper 18-D and also in Polymer Composites, April 1994, Vol 15 No2 pp 93–100. In these articles a two part reactive resin formulation, which is of low viscosity during impregnation or fibre wetting, is used in a RIM (Reaction Injection Moulding)—pultrusion process. Because of the low viscosity of the resin formulation during impregnation, well wetted fibres are likely to be obtained. However, although His process overcomes problems of pot-life, which are common to reactive systems, special RIM equipment is necessary to keep components of the resin formulation apart until required, since reaction is rapid on mixing. Such special RIM equipment will also promote rapid, efficient mixing of the reactive components. In principle fibre reinforce thermoplastic intermediates can be produced by this process, only a relatively narrow, specific range of resin components is suitable.

Radiation processes are known in the production of certain composites. U.S. Pat. No. 4,092,443 and U.S. Pat. No. 4,666,954 describe the preparation of prepregs from a photopolymerisable compound mixed with a heat activated curable epoxy system (thermosettable). GB 2 003 896 describes the production of composites from press moulding of prepregs (resin impregnated fibres sheets or tapes prepared from continuous fibres) or of sheet moulding compounds (impregnation of ready chopped (dry) fibres within a sheet or layer) from a composition containing a heat activated thermosettable (epoxy) resin system, a photopolymerisable resin and photoinitiator. The composites produced after moulding are thermosets and as such involve a reaction during the final moulding of a component. Furthermore, there is no use of pultrusion or of mouldable intermediates such as pellets or granules for injection moulding. In addition a specific resin composition based on Friedel Crafts resins is required.

WO 89/03761 describes the use of radiation curing to immobilise a fibre-resin composition which also contains an ambient temperature curable resin component. Manufacturing processes such as pultrusion and filament winding are described. However, the final composite products are thermoset and are produced after a second curing stage involving crosslinking reactions applied to the whole pultruded or filament wound structure. There is no reference to chopping or producing a mouldable intermediate such as a pellet or granule.

Radiation based pultrusion processes are reported in, for example, EP 0 290 849 which refers to an example of UV-pultrusion, although other variations are known. GB 2 245 893 A discloses a method for microwave pultrusion

SUMMARY OF THE INVENTION

The present invention is concerned with the use of and manufacture of fibre reinforced intermediates which are mouldable or usable in moulding or other thermoplastic processing methods, by methods which include a stage of coating or impregnating continuous fibres with a resin formulation and a stage of radiation exposure to effect polymerisation of at least one component of the resin formulation. Optionally a stage of consolidation forming may be present.

The continuous fibres may be impregnated by a resin formulation using known methods such as a simple resin bath which may incorporate rollers, nips, pins, dies, spreading surfaces or by other known methods.

Exposure to the radiation may be during, and/or after, the wetting of the fibres, and/or, in some cases immediately prior to wetting of the fibres. For example, the process may involve pulling wetted continuous fibres or filaments under tension through a die, or other apparatus suitable for shape forming/consolidation or coating/impregnation resin removal (eg drip-cups; doctor blades) prior to, and/or during, and/or after, exposure to radiation. One or more dies, or other suitable apparatus, may be used. Dies may be elongated, such as cylinders or other shapes, or short, such as rings, discs or other shapes or designs.

Thus a pultrusion type process, or other coating process suited to the wetting of continuous fibres or filaments, coupled with a radiation source for inducing polymerisation of one or more of the components of the resin formulation is an example of the invention.

Such fibre-resin intermediates are then able to be moulded or processed by other thermoplastic processing methods, or be used as one component in such methods. Typically the fibre-resin product can be:

chopped or cut into pellets or granules or other forms, which contain fibres of any desired length (as determined by the cutting stage), for subsequent moulding or compounding or other processing methods, with or without added polymer(s)/additives, or, alternatively, used, uncut, in other subsequent processing or mixing such as feeding into a continuous mixer or extruder, or other thermoplastic or elastomer type processing equipment, together with other polymer(s) materials, if desired.

The fibre-resin intermediates produced by this process are easily and well impregnated at convenient temperatures via economical methods suited to rapid continuous production rates, and the process involves radiation polymerisation of at least one of the components of the coating or impregnation formulation.

Advantages of using radiation polymerisation technology and materials include:

rapid and economical production;

no solvents are required in order to achieve suitable viscosities;

high temperatures are not required to achieve suitable viscosities;

ability to polymerise or process heat sensitive materials;

equipment is usually compact and space-saving;

long pot-lives (stable viscosity over long periods, even when heated);

cooling stages are not usually needed.

BRIEF DESCRIPTION OF THE DRAWINGS

The preferred embodiments of this invention will be described in detail with reference to the following figure, wherein:

FIG. 1 is a diagrammatic representation of an example of a simple apparatus suitable for carrying out the process of the invention.

DETAILED DESCRIPTION OF PREFERRED EMBODIMENTS

In one embodiment, the present invention thus provides a process for preparing a mouldable fibre-reinforced composite pellet, or other shaped mouldable intermediate. Such a process involves impregnating reinforcing fibres with a radiation-curable composition, and exposing the impregnated fibres to radiation to effect polymerisation of the radiation polymerisable components within the composition and cutting the continuous fibre reinforced product into pellets or other shaped intermediates. The products, usually pellets, produced by chopping the radiation polymerised fibre-resin combination, may be directly injection moulded alone, or mixed with added polymer and/or other added reinforced polymer, and/or with other additives.

In another embodiment the cut, radiation polymerised intermediate product is fed into an extruder or continuous mixer or kneader for compounding or mixing with further polymer(s) and/or other added reinforced polymer and/or other additives. The resulting modified or blended product can be cut again to provide a modified intermediate or pellet for subsequent moulding eg injection moulding, or other processing.

Yet another embodiment involves the use of the uncut radiation polymerised intermediates, which may be considered either as fibre resin rods or tapes prepared by, for example, a radiation pultrusion process, or as impregnated or wetted continuous fibres or bundles of fibres, as a feed into an extruder or continuous mixer or kneader with further polymer(s) and/or other added reinforced polymer and/or other additives. Subsequent cutting of this blended product can produce a mouldable intermediate.

Feeding of reinforcing fibres into extruders is known for production of fibre reinforced moulding compounds. However, the use of a radiation polymerisation based pre-coating or pre-encapsulating or pre-impregnation process prior to feeding into the extruder has potential advantages such as:

easy and good fibre wetting is achievable since the fibres will have been pre-impregnated with a composition of suitable viscosity at a reasonable temperature;

prelocation of additives on or near to the fibre eg additives for controlling fibre-matrix adhesion or for fibre protection during extrusion so as to result in longer retained fibre lengths after extrusion and/or injection moulding; such effects would also be expected to reduce wear on the injection moulding and extrusion machines;

incorporation of liquids or other materials which may be difficult or inconvenient to incorporate into an extruder or an injection moulding machine;

encapsulation or coating of materials or fillers for an improved interface or for reducing a tendency to migrate or for reducing any negative effects on other properties such as flow, or heat distortion temperature (HDT).

Indeed some or all of these advantages are potentially generally applicable to all embodiments of the invention and wing the radiation polymerised intermediates, which may in some cases effectively be a pre-coated fibre bundle, may have some such benefits compared to feeding chopped fibres (as received from the fibre manufacturer) into a compounding machine such as a screw extruder.

In those cases where other polymer(s) or other materials are mixed with the product from the radiation polymerisation process such as when they are added to a moulding machine or continuous mixer or kneader or compounding machine, they may be added at a pre-determined feed rate or pre-mixed by dry/tumble blending at a specific ratio or combined in other ways in order to achieve a specific fibre content and/or composition in the final moulding as desired. A high fibre content product from the radiation polymerisation process is particularly preferred in the cases where one or more polymer(s) or other additives are mixed with the product in a subsequent process such as moulding or compounding or kneading. Any polymer added at a subsequent moulding and/or mixing stage can be the same as, or different to, a polymer which may already be incorporated into the radiation polymerisable composition used for fibre-impregnation.

In pultruded rods, Vf (fibre volume fraction) values are generally in the range 0.1–0.7. However the process of the invention may also be used to coat the fibres with small amounts of resin coatings eg 2–10 wt %, and coated or pultruded resin-fibre products, after radiation exposure, may be within a wider Vf range such as possibly 0.11–0.9. Although higher Vf or fibre contents are preferred, the preferences will depend on fibre density and the resin formulation. Fibre contents of more than 30 wt % fibre are preferred but in many instances products after radiation polymerisation with more than 40 wt % or 50 wt % or 60 wt % or 70 wt % or 75 wt % or 80 wt % or 85 wt % fibres are more preferred.

In the cases where the products of the radiation polymerisation process are of high fibre contents (higher than what is ordinarily considered thermoplastically processable, unmodified, into a useful part; typically more than 60 or 70 wt % fibre) it will be useful to add or combine with thermoformable polymer(s) and/or other additives during subsequent compounding and/or moulding processes. In such cases the level of initial resin coating on the fibres, after radiation polymerisation, will be relatively low, such as, for example, 1–30 wt % of the total weight of coated fibre or rod product and, after 'dilution' with added polymer(s)/additives in the compounding and/or moulding process(es), will be reduced further to typically less than 25 or 20 wt % and often to less than 15 or 10 wt %. Indeed, depending on the impregnation resin content of the radiation polymerised products and the desired fibre content of the final product, the impregnation resin content may be lower than 5 wt % in a final part or moulding. A simple example illustrating this aspect is described as follows: an 80 wt % fibre radiation polymerised product (thus containing~20 wt % of the resin formulation used for impregnation which comprises radiation polymerisable component(s) and, optionally other additives/polymers) can be 'diluted' to a final 20 wt % fibre product by adding polymer(s)/additives in a compounder/extruder or moulding machine at a ratio of 1:3 (1 part radiation polymerised fibre-resin product: 3 parts added polymer). Thus the final moulded or compounded composition has 20 wt % fibre and 5 wt % of the original resin impregnation formulation system (both arising from the continuous impregnation and radiation polymerisation process). The radiation polymerised intermediates are in this case being used as a 'masterbatch' for further subsequent compounding or moulding with the effect of adding matrix polymer(s) and/or other additives. In such cases fibre levels may be reduced to those of normal injection moulding compounds (eg 5–50 wt % fibre). In some applications it may thus be preferred to use higher fibre content products of radiation polymerisation-impregnation process, and 'dilute down' (during, for example, compounding and/or moulding) to products with 50 wt % or less, 40 wt % or less, 35 wt % or less, 30 wt % or less, 25 wt % or less, 20 wt % or less, 15 wt % or less, or 10 wt % or less, fibre content.

Such 'dilution', during subsequent mixing or moulding, may be with added filled or reinforced polymers and with mixtures of such polymers with unfilled/unreinforced polymers.

Those intermediates which are produced by the radiation polymerisation process with lower fibre contents may be moulded directly without further compounding or without the need for mixing with added polymer(s)/additives, or may be used as described above as a masterbatch for further compounding or dry blending with added polymer(s)/additives.

The present invention is primarily concerned with the use of radiation polymerisable formulations for the production of fibre reinforced composite intermediates for subsequent moulding or for other subsequent processing. The other subsequent processing may include profile extrusion, compounding, kneading, blending, or other continuous mixing process, or calendering, and the use of two roll mills. Extrusion mixing may be with a single screw or twin screw (counter or co-rotating types). Compression, transfer and injection moulding, or other heat forming processes suitable for thermoplastics and their composites, or thermoplastic elastomers, may be used for the moulding of the fibre resin intermediates, with or without added polymer(s) or other materials, or for the moulding of modified (blended) intermediates prepared from radiation polymerised product mixed or compounded with other polymer(s) and/or other materials.

Injection moulding is a preferred moulding process and consequently pellets are a preferred geometry for the intermediates or blended intermediates, although any geometry, as determined by the manufacturing die shapes and the chopping lengths may be produced.

The production of fibre-resin intermediates via radiation polymerisation, either for direct subsequent moulding or for further compounding or other processing, is suited for continuous manufacturing processes. The radiation pultrusion or pre-impregnation/fibre coating stage may be carried out as a separate process, or it may form part of an overall continuous process and for example be immediately followed by, on-line, extrusion compounding followed by, if desired, chopping into mouldable intermediates. Again the chopping stage may be part of the overall continuous process or it may be performed separately at a later stage.

Within the invention a continuous radiation pultrusion type process is used to produce a rod-like (rigid or flexible) product or an impregnated fibre bundle from continuous fibres and radiation polymerised resin. This product can be subsequently chopped to produce a mouldable or thermoplastically processable intermediate. The chopping may be on-line by means of a strand granulator or at a later stage after winding off the pultruded or coated product. The chopping length can be varied from short (eg 0.2–5 mm) to long (eg 5–25 mm) to very long (>25 mm). The chopping length will usually determine the lengths of the fibres in the intermediate.

Indeed the product of the initial radiation pultrusion stage is not limited to rod like products—any geometry is allowed and will usually be determined in part at least by the geometry of any die(s) or resin removing or shape forming apparatus used, although some reshaping (eg flattening) after the radiation pultrusion is certainly possible. Rod like products are the more common initial pultruded product because of their suitability for subsequent chopping into pellets or granules.

In general a lower total fibre tex feed with a particular die diameter and/or a wider diameter die/rod with a particular total tex of fibre feed will result in a lower fibre content in the intermediate.

An example of a suitable process is UV-pultrusion, where continuous fibre rovings are pulled under tension through a resin (eg in a bath) which contains radiation polymerisable component(s) and which may be heated if desired and then the wetted fibres pass through a forming die (or other equipment to remove excess resin and determine rod shape and diameter). During this process the wetted fibres are exposed to UV irradiation from UV lamps to effect polymerisation. The product may then be wound up by a winder, or cut on-line or later, or fed into a compounding machine, on-line or later. The initial product may thus be a rigid or flexible rod comprising continuous fibre roving and a UV polymerised resin formulation. It may also be a coated bundle of such fibres wherein the coating is the UV polymerised resin formulation. Optionally a second arrangement of "resin bath-die-lamp(s)" may be present in series, before wind-up or chopping or other use, to complete the resin-fibre intermediate manufacture and/or control the fibre-resin volume ratio and/or allow application of an outer coating or other component. The same, or different, resin formulation may be used as an outer coating as is used in the first impregnation stage.

The components of the radiation polymerisable compositions may be used within a wide range of relative proportions. Compositions useful in the invention may comprise:

1. Polymerisable monomer/oligomer, or mixtures thereof: 100 parts by weight.
2. Polymer or elastomer or other additives: 0–300 parts by weight.
3. Photoinitiator: 0–12% by weight of total composition.

Where present, the nature and level of any added polymer in the impregnation formulation, as well as the radiation curable components and the nature and level of the fibre, will influence the properties of the final composite. Thus a tailoring of composite characteristics is possible. Compositions can be tailored to provide fibre reinforced flexible, elastomeric mouldings and also for stiff or higher strength composites. The radiation polymerised composition may be soft or elastomeric or rigid or hard or any gradation between. Linear, branched or crosslinked structures, or any other polymer type may be formed by the radiation polymerisation.

Polymerisable monomers are those molecules which can react together to form a polymer. In many cases, mixtures of polymerisable monomers will co-react with each other. The polymer-forming reactions are usually chain reactions involving radical or ionic intermediate, and the classes of materials that commonly undergo such reactions either contain ethylenic unsaturation or reactive ring structures. Examples of unsaturated ethylenic materials are those with acrylate and methacrylate functionality, other vinyl or alkenyl fictional materials such as styrene and its derivatives, unsaturated polyesters, vinyl esters (eg vinyl acetate or other vinyl esters of higher acids), allyls, N-vinyl pyrrolidone, acrylamides, N-methyl, vinyl acetamide, maleimides and vinyl ethers. Examples of reactive ring structures are cyclic ethers, such as epoxide resins which are capable of such chain reactions via ionic ring-opening reactions. Cationic radiation polymerisable components useful in the invention include mono-functional and multi-functional epoxides or vinyl ethers, or their mix, with or without added polyols.

Compositions containing monomer(s) or oligomer(s) which are rapidly reactive under exposure to the radiation are preferred. For example, for UV or visible radiation, acrylate and/or methacrylate functional structures and/or N-vinyl pyrrolidone and/or N-methyl vinyl acetamide, either as the sole type of polymerisable component, or as part of a mixture with each other or with any other types of polymerisable materials, are a preferred class of radiation polymerisable monomers/oligomers.

Acrylates or methacrylates may be monofunctional or multifunctional (>1 (meth)acrylate group per molecule). Usual monofunctional acrylates (R—O—CO—CH=CH$_2$) or methacrylates (R—O—CO—C(CH$_3$)=CH$_2$) are those where R may be an aliphatic chain (linear or branched) and/or cycloaliphatic and/or aromatic and/or heterocyclic ring structure and may also contain other bonds or functionalities such as amide(s), amine(s), urethane(s), urea(s), ether (s), hydroxyl, epoxy, carboxylic acid, sulfonic acid or acid anhydride.

Examples of monofunctional acrylates are:

hexyl acrylate, 2-ethylhexyl acrylate, butyl acrylates, hydroxypropyl acrylate (HPA), hydroxyethyl acrylate (HEA), hydroxybutyl acrylate, octyl acrylate, iso-octyl acrylate, nonyl acrylate, iso-nonyl acrylate, decyl acrylate, iso-decyl acrylate, octyl/decyl acrylate (ODA), benzyl acrylate, cyclohexyl acrylate, t-butyl cyclohexyl acrylate, methoxy ethyl acrylate, phenoxy ethyl acrylate, ethoxylated phenoxy ethyl acrylate, propoxylated phenoxy ethyl acrylate, nonyl phenoxy ethyl acrylate, butoxy ethyl acrylate, lauryl acrylate, stearyl acrylate, isobornyl acrylate, dihydrocyclopentadiene acrylate, tetrahydrofuryl acrylate, ethoxyethoxy ethyl acrylate and other alkoxylated acrylates, acrylic acid, β-carboxy ethyl acrylate, dimethyl amino ethyl acrylate, imidazole acrylic acid and derivatives and other acrylate or acrylic acid functional heterocycles, commercial urethane mono-acrylates such as Genomer M220 (an acrylated urethane sold by Rahn Inc), mono-epoxy acrylates (acrylated mono- epoxides) such as Ebecryl 111 (UCB Chemicals) and epoxy half-acrylate oligomers (partially acrylated epoxides or epoxy resins, with epoxy and mono-acrylate, on average, functionality) such as Ebecryl 3605 (UCB Chemicals), mono-acrylated silanes or siloxanes, and halogenated acrylates such as Zonyl fluoroalkyl acrylates (Du Pont).

Methacrylate equivalents and related materials are also prefers including methyl methacrylate.

Preferred multifunctional acrylate components/oligomers may again be aliphatic and/or cycloaliphatic and/or aromatic and/or heterocyclic based molecules also optionally containing other functionalities. Examples are:

hexanedioldiacrylate (HDDA), butanediol diacrylate, butylene glycol diacrylate, tripropyleneglycol diacrylate (TPGDA), ethylene glycol diacrylate (EGDA), di- and tri- and tetra-ethylene glycol diacrylates trimethylolpropanetriacrylate(TMPTA), ethoxylated and propoxylated TMPTA, glycerol acrylates, epoxy soya bean oil acrylate (ESBOA), acrylated epoxy linseed oil, neopentyl glycol diacrylate, ethoxylated or propoxylated neopentyl glycol diacrylates, ethoxylated or propoxylated bisphenol A diacrylates, pentaerythritol tetra- and triacrylate, dipentaerythritol pentacrylate, tris-hydroxyethyl isocyanurate triacrylate, alkoxylated bisphenol-A-acrylate esters. In addition there are many types of commercial oligomeric acrylates such as epoxy acrylates (e.g. bisphenol A epoxy acrylates, epoxy novolac epoxy acrylates—which are acrylated epoxy resins), polyester acrylates (acrylated polyester resins), polyether acrylates (acrylated polyether/polyols), urethane acrylates (acrylated polyurethanes or urethane oligomers), silicone acrylates, and amine and melamine acrylates, which may be included. Again methacrylate equivalents arc also preferred.

Details of such materials can be found in many text books on radiation curable formulations eg "Chemistry & Technology of UV & EB Formulation For Coatings, Inks and Paints" Vol 2, Ch2, edited by P. K. T. Oldring (ISBN 0,947798 10.2; Sita Technology, London UK). Some are contained within the examples.

Usually, when the radiation curable composition is monofunctional dominant then the polymerised composition, with or without added polymers, exhibits thermoplastic or thermoplastic elastomer characteristics and is heat formable or mouldable. In this way a range of thermoplastic mouldable fibre reinforced composite rods for subsequent use or processing or for on-line chopping into intermediates or pellets, can be produced very rapidly and efficiently with good,, fibre impregnation and at moderate temperatures.

Depending on the overall functionality in the system the radiation polymerisation can produce linear or crosslinked structures. The presence of multifunctionalpolymerisable monomers (ie functionality >1) ordinarily leads to crosslinked structures and a greater amount of multifunctionality usually means a greater level of crosslinking. Highly crosslinked structures are not usually subsequently mouldable or processable by thermoplastic methods since they are thermoset products. However, compositions useful in the invention may contain multifunctional monomers or oligomers which lead to branching and/or crosslinking. In some instances relatively low levels of multi-functional polymerisable component(s) can be used (eg less than 20 wt % and preferably less than 10 wt % of the monofunctional component content) but higher loadings may also be usefull in other cases. The actual levels will depend on the individual structures of the other components—mono-functional and multi-functional—in each formulation In certain applications higher loadings of multifunctional polymerisable components may be useful despite production of a highly crosslinked thermoset or near thermoset like structure around filaments and thus not ordinarily being amenable to subsequent thermoplastic type processing, such as injection moulding or extrusion compounding.

The control of the level of crosslinking in the radiation polymerised components and/or the rigidity and/or melt formability of any added polymer(s), if present, or other additives together with the loading levels of the resin coating may be a usefull route to controlling subsequent fibre distribution patterns, such as easily dispersed well filamentised fibres after extrusion and/or injection moulding, or more tightly bound fibres in fibre bundles, or other fibre distribution patterns.

Certain radiation polymerisable or copolymerisable materials with other potentially reactive functionality may be incorporated into the impregnation formulation eg materials with carboxylic or sulfonic acid, or acid anhydride, or epoxy, or hydroxy, or phenolic, or amine functionality or unsaturation or other type of polymerisable or copolymerisable or graftable monomer or oligomer. Such materials may help to improve or control the fibre-resin adhesion, or the interface/adhesion with other additives/fillers, or may assist in compatibilisation of, or with, polymers which may be present in the radiation polymerisable formulation and/or which may be added subsequently, for example during a moulding or compounding stage. Thus, for example (meth)acrylic acid, or its anhydride, or β-carboxy ethyl acrylate or maleic anhydride and its derivatives, or hydoxy alkyl acrylates, or bisphenol-A diepoxide-half acrylate (an epoxy functional acrylate) or glycidyl (meth)acrylate derivatives may be usefull components of the radiation polymerisable composition.

Other polymerisable monomers may aid flow in subsequent injection moulding and/or help reduce fibre damage or fibre length reduction after extrusion or injection moulding.

Similarly, polymerisable phosphates eg (meth)acrylate esters of phosphoric acid and/or polymerisable brominated materials eg pentabromobenzyl (meth)acrylate or bromostyrenes may be useful for imparting fire retardant properties. Selection of flexible polymerisable co-monomers may lead to improved impact resistance in the final composite. Although in such instances the proximity of such components to the fibres may not be always necessarily advantageous the invention provides an easy route for their incorporation and for tailoring related end properties of final moulded articles by simple adjustment of the impregnating formulation which comprises radiation polymerisable component(s) and optionally added polymer(s) and/or other additives.

The impregnation composition may also include one or more components which are polymerisable or copolymerisable, graftable or crosslinkable by thermally activated methods including thermally initiated radical reactions.

In some preferred impregnation compositions one or more polymer(s) may optionally be added. Suitable polymers include elastomers or rubbers and/or thermoplastics and/or thermoplastic elastomers or any other polymer. The polymer (s) is soluble, miscible, or dispersible in the radiation polymerisable component(s). Polymer powders are typically used. Pellets or prills or other forms may also be used Liquid or low melting elastomers or polymers or waxes may also be used.

Examples of elastomers or polymers suitable for use according to the invention are:

polyolefins, or any polymer containing alkenyl units or any polymer containing units from at least one of butadiene, ethylene, propylene, butene, isobutene or isoprene, polyethylene, polypropylene, polybutenes, polyisobutylenes, polyisoprenes, ethylene-propylene polymers and halogenated derivatives, polymethyl pentene, polyurethanes, fluorinated polymers and rubbers, isoprene-acrylonitrile copolymers, polybutadienes, butadiene-acrylonitrile copolymers, polystyrene or any polymer containing styrenic units, co- and ter-polymers based on styrene and ethylenic comonomers such as styrene-butadiene copolymers (random and blocks), styrene-isoprene copolymers (random and blocks), styrene-ethylene-butene terpolymers, polychloroprene, polyepichlorohydrin, chlorosulphonated polyethylene, chlorinated polyethylene or polypropylene, copolymers of ethylene and/or propylene with other alkenes, halogenated or partially halogenated polymers or polymers derived from a monomer feed in which at least one monomer is a halogenated or partially halogenated monomer, silicone rubbers and polysiloxanes, polyvinyl ethers, a polyacrylate or any polymer containing acrylate or methacrylate units, polymethyl methacrylate, other polyacrylates and acrylic co- or ter-polymers such as copolymers of methyl methacrylate with other esters or alkoxy esters of acrylic or methacrylic acids (eg isobutyl (meth)acrylate), copolymers of ethylene or propylene with esters (eg ethylene ethyl acrylate or ethylene butyl acrylate) or alkoxy esters of acrylic or methacrylic acid, copolymers of ethylene or propylene with vinyl esters of carboxylic acids such as ethylene-vinyl acetate copolymers, polyvinylacetate or any polymer containing vinyl acetate or vinyl ester units, ethylene-vinyl alcohol polymers, polyvinylalcohol, polyvinylbuyral, polystyrene, styrene acrylonitrile (SAN), styrene-maleic anhydride (SMA) and ester derivatives, strene-acrylic co- and ter-polymers such as ASA and other styrene copolymers including block copolymers such as Kraton or Cariflex from Shell Chemicals and related polymers, polyvinyl chloride (PVC) and copolymers of vinyl chloride, acrylonitrile-butadiene-styrene (ABS), polycarbonates, polyesters such as poly (ethylene-) and poly (butylene-) terephthalates or naphthenates and polycyclohexanedimethanol terephthalates and related copolymers, polyarylates, polyetherimide, polyimides, polyethers, including polyphenylene ether and polyvinyl ethers, polyacetal, polysulphone, polyethersulphone, polyketones including aliphatic polyketones and polyether ketones, polyamides, polysulphides, cellulosics, polypthtalamide, ionomer, epoxy resins including bisphenol epoxy resins, epoxy novolaks and epoxy cresol novolak resins, phenoxy resins, phenolic resins including novolak and resoles, unsaturated polyesters or vinyl esters or bismaleimides, melamine and urea formaldehyde polymers. Co- and ter-polymers based on any of the above maybe used.

The impregnation resin composition may thus contains at least one polymer or resin which is a liquid, semi-solid or solid, and which is dissolved or dispersed in the radiation polymerisable component(s). The polymer may be an elastomer or rubber or a thermoplastic polymer or a thermoplastic elastomer (TPE) or a reactive resin/oligomer, or mixtures thereof.

There is no requirement that any added polymers or other additives co-react during radiation polymerisation and/or subsequent processing/moulding, although this is within the scope of the invention. Indeed thermally induced reactions during any or all of these stages or may occur naturally or during heating or drying stages, or they may be induced by selection of suitably reactive functionalities, in either monomer/oligomer materials and/or polymers) or other added materials. Such polymers include those present in the impregnation formulation and/or those added in a later process such as moulding or compounding. Peroxides or other thermal radical initiators, or other catalysts, can be added at any stage to promote such reactions during any of these stages.

A combination of reactive functionalities and additives or catalysts may be present in the impregnating formulation, and/or in polymers or materials which may be added subsequently such as during a moulding or compounding process. Mixtures of polymers may be compatibilised during moulding or compounding by combining with a fibre-resin intermediate, particularly a high fibre content intermediate, produced by the process of the invention and which may bear suitable combinations of reactive functionalities and/or catalysts and/or thermal radical initiators, arising from components of the resin impregnation composition. Such a fibre-resin intermediate may be used to process or combine plastic waste or recyclate, which may comprise mixtures of different types or grades of polymers, or to process other mixtures of polymer based materials or compositions. For example, the presence of one or more reactive functionality and/or catalysts and/or radical generators within a well impregnated fibre intermediate, prepared by the process of the invention, when mixed with plastic waste or recyclate can lead to a compound or moulded product which shows useful properties. This is a useful route to enhancing properties, or generate useful properties, from off-specification or waste plastic materials or other polymer materials or mixtures of materials. Normal or virgin polymer grades can also be used.

Certain polymers show some solubility in certain UV curable components and such soluble polymer-'monomer' combinations are sometimes preferred. However, the same (or different) polymers will also be insoluble in other radiation curable components and in such cases they can be added as powders dispersed in the monomer system. Polymers which are generally insoluble in most radiation polymerisable monomer/oligomer systems, such as polyamides, polyoxymethylene, polyketones, polytetrafluoroethylene, polyphenylene sulphide, polyethylene and polypropylene, can be used as powders dispersed in the radiation polymerisable component(s). Useful examples of compositions containing dispersed powders and/or soluble polymers are given in the Tables of Examples. In some cases the 'polymer solutions' are cloudy and incompletely dissolved, but such systems remain usable in the invention.

The elastomers and other polymers present in the impregnation formulation may bear reactive functional groups such as epoxide, carboxylic or sulfonic acid, or acid anhydride, or hydroxyl or amine, or phenolic, or have units of unsaturation—but this is not a necessary pre-requisite. In some cases however such polymers may be beneficial in imparting compatibilisation of mixtures of polymers and/or of the radiation polymerised component(s) with added polymers, present either in the coating formulation and/or added later during compounding or moulding or other processing. They may also aid in improving or controlling fibre-resin or filler-resin adhesion.

The fibre-resin interface is often a poorly controllable characteristic in thermoplastic composites and the invention allows an opportunity to directly incorporate in the locality of the reinforcing fibre, ie coat the fibres with, suitable additives for controlling fibre-matrix adhesion and/or for protecting the fibre against damage during moulding, or for other reasons.

For example, acid functional polymers such as maleic anhydride copolymers are useful in this respect eg SMA or anhydride/acid modified block copolymers such as the Kraton series from Shell Chemicals, maleic anhydride modified polypropylene or polyethylene or related copolymers, or epoxy functional polyolefins and other epoxy functional polymers, including epoxy resins and their derivatives. The location of some polymers, as those mentioned, on or near to, the fibres may improve mechanical and/or other properties and may offer advantages (because of, for example, the use of low viscosity impregnating formulations and/or direct placement on or near to fibres) over other usual methods of production of fibre reinforced mouldable intermediates where such additives are usually only randomly dispersed within the fibre-polymer mixture eg in an extruder. This approach can, if desired, be used in conjunction with simultaneous incorporation of related polymerisable components bearing reactive functionalities.

Similarly the location of elastomers/rubbers or other polymers or other additives on, or in the vicinity of, the fibres may aid toughness or impact resistance or other properties of the final moulded composite and the location of certain additives or polymers on or in the vicinity of the fibres may, in some cases, reduce fibre damage and/or aid flow in injection moulding and/or extruders. Again this approach may be used in conjunction with incorporation of specific polymerisable components for the same objectives.

The net result of such approaches may be longer fibres in the final moulding and/or fibre reinforced mouldings or parts with a tailored or controlled fibre-polymer interface. These are often desirable characteristics for attainment of certain properties in injection moulded articles.

In addition certain components which may be polymerisable and/or polymer based or any other additive may advantageously influence the tendency of the fibres to filamentisation during subsequent processing such as for example injection moulding. A high degree of filamentisation is sometimes desirable for achievement of certain properties in the final mouldings. Conversely fibre bundling is also advantageous for certain other performance characteristics. The nature of the coating applied to the fibres by the radiation process can sometimes be adjusted to control this. For example, varying the degree of crosslinking via use of multifunctional polymerisable monomers may achieve this—a high level of crosslink may favour a higher degree of retained fibre bundles after moulding. A higher degree of crosslink may also aid fibre length retention (ie, reduce fibre damage) after extrusion and/or injection moulding.

Sometimes it is desirable, but not essential, to use a low molecular weight polymer as an added polymer in the radiation polymerisable impregnating system since dissolution in monomer and/or higher polymer loadings in the impregnating system is facilitated—for those cases where solutions are used. In addition there may ultimately be advantages in subsequent processing, such as extrusion or injection moulding, eg flow enhancement or better fibre-resin interface.

An advantage of using a pre-pultruded or pre-impregnated fibre reinforced intermediate which is of relatively high fibre content and suitable for subsequent combination with added polymer, is that additives or components can be pre-located on or near to the fibres via the process of the invention.

There is also an opportunity to locate and/or encapsulate additives within the radiation polymerised fibre-resin intermediate. For example, desirable liquid additives such as some flame retardants may be incorporated by inclusion in the radiation polymerisable composition, although the additives themselves are not necessarily polymerisable. On exposure to radiation during the pultrusion type process the induced polymerisation leads to encapsulation of additives within the resin-fibre intermediate. This process can be a convenient route to incorporation of particular additives such as liquids which are not easily added to an injection moulding machine or extruder. In some cases such radiation induced polymerisation and encapsulation approach may remove or reduce any problem of migration of certain additives after moulding. Alternatively the location of an additive close to a fibre and/or the encapsulation or coating of such an additive may help to reduce any deleterious effects on other characteristics such as flow or matrix dominated mechanical properties or environmental resistance.

Several types of electromagnetic radiation have been used for the polymerisation of monomers and/or oligomers and are suitable for use in the present invention. Ultra-violet (UV) light is common but also used are gamma rays, X-rays, electron bean and visible radiation. Infra-red (IR) an microwave radiation may also be used, although they act in a different manner to other radiations mentioned. Microwave and IR radiation interact with appropriate molecules (through molecular vibrational modes) to raise their thermal energies and this then becomes the source of initiating and propagating reactions. With other types of radiation mentioned there is no requirement for 'conversion' to thermal energy, although some of this effect will probably occur, and active species (eg ions, radicals, excited states) are primarily generated through the effects of the incident radiation on molecules (initiating or reactant, depending on whether an initiator is required). Radiations for photo-induced or photo-initiated polymerisation are preferred. The invention is most preferably carried out with UV and/or visible radiation, generally in the range of from 200 to 800 nm in wavelength. Electron beam (EB) and other radiations mentioned may also be used.

UV, visible and EB radiation induce photo-polymerisation by photo-generation of initiating or propagating species. In EB, photo-generation is usually direct and without the need for a photoinitiator system (except in cationic photopolymerisable systems). However, with UV and visible incident radiation, photoinitiator(s) and/or photosensitisers are required (for both radical and cationic photopolymerisable systems). In the absence of such molecules or combinations, generally little or no polymerisation will usually occur on exposure to the UV or visible radiation.

Photoinitiators are usually required in UV curing (photopolymerisation) of compositions according to the invention, but may not be essential if other types of radiation are employed, or if self-initiation capability is present. Thus, one or more photoinitiators and/or photosensitisers may be included. Examples for radical systems include α-hydroxy ketones, benzoin ethers, aceto- and benzo-phenones and ketones containing morpholine moieties, thioxanthones, 1,2-diketones, acyl phosphine oxides, photoactive oximes, Michler's Ketone, amine synergists including amine alcohols such as triethanolamine, eosin, titanocene derivatives and dye-sensitised co-initiator systems for visible light curing.

Cationic polymerisable systems, may also be used in the invention. Examples of suitable photoinitiators for cationic systems are onium salts such as triarylsulphonium salts eg FX512 (3M Co), Degacure KI85 (Degussa Co), Cyracure UVI 6974 and 6990 (Union Carbide); transition mental complexes such as Irgacure 261 (Ciba Geigy).

Other additives may be present in the resin impregnation formulation, and include or example, adhesion promoters, coupling agents (eg silanes or titanates), air release agents, anti-foaming agents, surfactants, fillers, pigments, colourants, wetting agents, lubricants, inhibitors, stabilisers, antioxidants, tackifying resins, blowing agents, flame retardants, thermal catalyst(s) or initiator(s) such as peroxides.

A blowing agent may be readily incorporated into the intermediate within the radiation polymerisable composition. This may be particularly advantageous when desiring to use certain heat activated blowing agents which will not be activated during impregnation/radiation polymerisation if bath temperatures are controlled appropriately but which can be activated later during a subsequent processing or moulding stage where higher temperatures may be experienced.

Fillers such as talc, mica, kaolin, wollastonite, calcium carbonate, feldspar, silica or flame retardant additives such as alumina trihydrate, antimony compounds, borates and others may be added into the radiation curable composition.

In some cases a small amount of added surfactant to the resin formulation may aid stabilisation of dispersions of added polymers and or fillers or other additives, although simple agitation of the resin may itself be sufficient.

Continuous fibres are used in the invention. Usually such fibres can act as reinforcements although other purposes may be served eg for electrical conductivity or EMI shielding. Continuous fibre rovings, filaments, or tows are most commonly used but other continuous fibre forms such as yarns or ribbons or tapes may also be used, if they are suitable for production of a radiation cured intermediate capable of subsequent or eventual thermoplastics processing, including moulding and compounding.

Glass is a preferred fibre. However others may be used such as: carbon fibre, organic polymer fibres such as polypropylene, polyethylene, polyvinyl acetate, polyethylene terephthalate and other polyester fibres such as Vectran (a liquid crystal polyester fiber from Hoechst Co), acrylic fibres, polyurethanes, nylon and aramid fibres, cellulosic fires or natural fibers such as cotton or rayon or jute, metal fibres (eg Beki-Shield, a stainless fibre tow from Bekaert) and ceramic fibres. Mixtures of fibres (eg glass and aramid; glass and metal; glass and carbon; cellulose and metal etc) may also be used.

A feature of the use of radiation, and particularly UV-VIS or EB is that heat sensitive materials can be processed relatively conveniently and so such organic polymer based fibres as mentioned above with relatively low softening points may be conveniently used whereas in conventional pultrusion processing with hot-melt and/or heat activated resin cure systems the high temperatures experienced may limit the use of such fibres if they are required to retain an fibrous structure.

An important factor for productivity is the line speed which can be achieved, and this depends on rod diameter or profile size, total UV lamp power and lamp geometries, the path length for good fibre wetting and the associated design of impregnation and related equipment, as well as other factors such as the fibre type, he fibre-resin ratio, the resin formulation (including photoinitiator), and other additives and any transmission/scattering of radiation. However, a feature of the radiation polymerisation approach is that line speeds are typically significantly greater than the more usual heat activated reactive pultrusion or hot-melt type pultrusion/impregnation.

In addition to influencing the properties of moulded end products added polymer to the impregnating formulation, where present, can contribute to improved productivity (eg faster line speed) since monofunctional dominant polymerisable composition tend to be slower to polymerise compared to formulations containing larger amounts of multi-functional monomers. The presence of added polymers can reduce the amount of polymerisation required. The radiation-curable matrix components (ie the composition without, or before, addition of polymer) desirably have as high reactivity to enable a fast line speed concomitant a reasonable degree of monomer conversion. In some cases this may be achieved or improved by the incorporation of other catalysts or initiators or promoters such as amines, mixed photoinitiators, or thermally activated initiators such as peroxides. Greater radiative power/exposure can also assist in this. The addition of multifunctional polymerisable components may also assist.

The radiation curable composition should be of a suitable viscosity at the application temperate to allow efficient fibre impregnation at reasonable line speeds. The use of a liquid or relatively low viscosity composition (at the appropriate resin temperature) in the process allows better and/or easier fibre wetting and allows rapid manufacture at conveniently low temperatures across a wide range of fibre-resin ratios. Higher viscosities can also be used as long as good fibre wetting is achieved.

The radiation-curable composition (with or without added polymer) thus has a stable, usable viscosity so as, for example, to allow good impregnation of fibres at reasonable or moderate temperatures, such as up to about 180° C. but generally less than 150° C., preferably less than 120° C., and more preferably less than 100° C. In such cases where heating of the impregnation composition is required then lower volatility and lower irritancy components are preferred. In some cases, where viscosities allow, and in particular where little or no added polymers or viscous oligomers are used the radition polymerisable resin formulation, the process may be carried out with such resin at ambient temperatures or just above.

EXAMPLES

Tables 1 and 2

Example 1

A composite rod or fibre-resin intermediate was prepared using a composition according to the invention as follows:

20 g of EVA copolymer (Escorene UL02825CC from Exxon) was predissolved in 100 g of isooctyl acrylate (IOA) at a temperature of about 50–60° C. Then a photoinitiator (benzildimethylketal) was added in a proportion of 2% by weight based on the total weight of the composition. This mixture was then placed in a heated resin bath at about 70° C. and used to coat continuous glass fibre rovings in a UV pultrusion process similar to that illustrated in the accompanying drawing to produce a cured composite rod.

The accompanying drawing is a diagrammatic representation of a example of a simple apparatus suitable for carrying out the process of the invention. Variations are possible and essential features are a capability to coat or impregnate fibres with a liquid formulation, at an appropriate temperature, and a radiation source to induce polymerisation of the coating formulations.

Rod of approximately 0.9 mm diameter was produced using one UV lamp and 1100 tex (approximately) glass fibre roving. A line speed of 12–13 meters per minute was used to produce 0.9 mm rod (about 80–85% by weight glass) in this example. The rod or coated fibre roving is subsequently chopped to produce pellets for subsequent moulding, with added other polymer(s) or is fed into an extruder, again with added other polymer(s), to produce a thermoformable intermediate such as a pellet for injection moulding.

In systems without added polymer the polymer pre-dissolution stage described above was not necessary.

In a similar set of experiments, a 2 mm diameter rod is produced. The line speed was 60 to 85 meters per minute.

About 2 to 6 UV lamps were used. Glass fibres were present at about 82–88 wt %. The formulations used to prepared such rods or coated fibres, prior to subsequent chopping; moulding or extrusion processing are shown in Table 2.

Outgassing measurements of samples of pultruded rod or coated fibres after radiation polymerisation were made in some cases. Outgassing weight loss is the weight loss of fibre-resin samples after heat aging, in this case for 30 mins at 204° C., Lower weight loss values may relate to more complete monomer conversion and may allow a faster line speed capability. A value of 2 wt % or less is sometimes preferred and more preferred arm values of 1.5% or less and 1% or less. Relatively high outgassing values may be reduced, if required by additional and/or more powerful lamps and/or slower line speeds and/or adjustment of the fibre-resin radio and/or by applying heat. In addition it can be seen that the outgassing values are usually lower when polymer is added to the system and/or when multifunctional component is present. Furthermore certain monofunctional monomers give rise to lower outgassing values. This implies that even faster speeds are feasible for the production of the fibre-resin intermediates with equivalent, fibre contents and/or for the manufacture of lower fibre content products, when the impregnation formulation contains added polymer(s) and/or added multi-functional polymerisable component(s). Optimum choice of polymerisable monofunctional component(s) can also help achieve this. In any case these line speeds are all usually more rapid than readily achievable in conventional heat activated reactive pultrusion and also in hot-melt type pultrusions.

If required, drying or heating of the radiation polymerised product can be carried out. In some cases such a heating or drying stage may help devolatilisation and/or complete polymerisation reactions and/or initiate or complete any thermally desirable reactions between components. It is common practice in many cases to heat or dry polymer pellets prior to compounding and/or moulding. Thus, such heating of the product of the radiation polymerisation, or of the product of mixing or compounding the radiation polymerised product with other polymers or additives, can be carried out and can assist with outgassing or drying, if necessary. It may, alternatively or in addition, promote thermal reactions between components in the radiation polymerised intermediate and/or between such components and other components which may have been mixed or compounded with the radiation polymerised product. Thus, included within the invention arc options for devolatilisation and/or thermal reactions or thermally assisted reactions, by heating either as a separate stage, such as after radiation polymerisation or compounding or prior to final processing, or during any of the processes used, provided that thermoplastic processibility is retained for the final processing stage, eg injection moulding, of the fibre resin intermediate its blended product.

TABLE 1

0.9 mm Diameter Rods/Intermediates

| Formulation (Wt Ratios) | | Outgassing Wt loss % |
|---|---|---|
| IDA/HDDA | 10/1 | 2.4 |
| IOA/HDDA | 10/1 | 1.7 |
| IDA/HDDA/EVA | 10/1/1 | 1.8 |
| IDA/HDDA/PH4025/EVA | 10/1/1/1 | 1.1 |
| IDA/HDDA/EB80/EVA | 10/1/1/1 | 1.2 |
| IDA/HDDA/EB80/EVA | 10/1/1/3 | 0.6 |

TABLE 1-continued 0.9 mm Diameter Rods/Intermediates

| Formulation (Wt Ratios) | | Outgassing Wt loss % |
|---|---|---|
| IDA/HDDA/EB80/UL05540 | 10/1/1/3 | 1.0 |
| IDA/HDDA/EB80/UL04533 | 10/1/1/3 | 1.0 |
| IDA/HDDA/EB80/UL15028 | 10/1/1/3 | 1.0 |
| IDA/HDDA/EB80/UL00728 | 10/1/13 | 0.8 |
| IDA/HDDA/EB80/ELV4320 | 10/1/1/3 | 1.0 |
| IDA/B702 | 10/1 | 1.2 |
| IDA/CN111/EVA | 6/6/2 | 0.9 |
| IDA/SR2000/EVA | 6/6/2 | 1.1 |
| IOA/HDDA/EVA | 10/1/2 | 0.9 |
| IOA/HDDA/EVA | 10/1/3 | 0.6 |
| IOA/CN104/EVA | 10/2/2 | 1.1 |
| IOA/TPGDA/EVA | 10/2/2 | 1.5 |
| IOA/HDDA/B702 | 10/1/1 | 0.8 |
| IOA/HDDA/ELV4260 | 10/1/3 | 0.6 |
| IOA/HDDA/PH4770/EVA | 10/1/1/2 | 1.1 |
| IOA/CN965/EVA | 7/3/1 | 0.7 |
| EOEOEA/B702/TTEGDA | 10/2/1 | 1.9 |
| EOEOEA/B722/TTEGDA | 10/2/1 | 2.1 |
| PEA/B702 | 10/1 | 0.7 |
| M220/B702 | 10/3 | 1.8 |
| SR2000/CN111/EVA | 10/10/2 | 0.6 |
| PEA/EAA | 10/5/2 | 0.5 |

TABLE 2

2 mm Diameter Products

| Formulation (Wt ratios) | | Out-Gassing Wt loss (%) |
|---|---|---|
| IOA/HDDA/EVA | 10/1/2 | 1.2 |
| IOA/HDDA/EVA | 10/2/2 | 0.7 |
| EHA/HDDA/EVA | 10/1/2 | 0.9 |
| ODA/HDDA/EVA | 10/1/2 | 1.0 |

Notes to Tables 1 and 2
Photoinitiator = benzil dimethyl ketal at 2% wt, of impregnation formulation.
Resin bath temperature: approx 70 C.
Glass fibre is present at about 82–88% by wt.
Materials' Abbreviations
IOA = iso-octyl acrylate.
ODA = octyldecyl acrylate (UCB Co.)
IDA = iso-decyl acrylate.
HDDA = hexanedioldiacrylate.
EHA = ethylhexyl acrylate.
CN104 = Sartomer bisphenol - A epoxy acrylate oligomer.
EB80 = Ebecryl 80, a polyether acrylate from UCB Co.
PH4770 = Photomer 4770 (an amine acrylate from Henkel Co).
PH4025 = Photomer 4025 (an ethoxylated bisphenol A acrylate from Henkel Co).
CN111 = epoxy soya bean oil acrylate, from Sartomer.
SR2000 = $C_{14}$ chain diol diacrylate from Sartomer.
PEA = phenoxy ethyl acrylate.
EOEOEA = ethoxy ethoxy ethyl acrylate.
TPGDA = tripropyleneglycol diacrylate.
M220 = Genomer M220 urethane monoacrylate (Rahn).
TTEGDA = tetraethyleneglycoldiacrylate.
CN965 = urethane acrylate (UA) oligomer.
EAA = ethylene-acrylic acid (wax or powder).
EVA = ethylene vinyl acetate copolymer (MFI (melt flow index) = 25, VA content 28%) eg Exxon Escorene UL02528 or a powdered equivalent version of this such as Coathylene CN5175 from Hoechst Celanese Co.
Other EVAs mentioned specifically are Escorene UL05540 (MFI = 55 VA = 40%), UL04533 (MFI = 45, VA = 33%), UL15028 (MFI = 150, VA = 28%), UL00728 (MFI = 7, VA = 28%).
ELV 4000 series (eg Elvax 4320 & 4260) = acid functional EVA copolymers from DuPont.
B702 and B722 are Neocryl acrylic copolymers from Zeneca Resins. B702 is an iso-butyl methacrylate copolymer and B722 is an ethyl methacrylate/methyl methacrylate copolymer.

EXAMPLES

Tables 3, 4 and 5

Formulations containing other polymers and monomers are listed in Tables 3, 4, and 5. Here, unless, otherwise stated, glass fibre reinforced resin intermediates were produced using the method of Example 1 with a resin bath temperature in the range of 50–80° C. In Tables 3, 4 and 5 different rod diameters were prepared (by altering the diameter of the forming die) and also fibre volume (or weight) faction; were altered by control of the number of and tex of feeding glass fibre tows in relation to the forming die diameter. For example, the use of four approximately 270 tex glass fibre tows, or an approximately 1170–1180 tex glass fibre tow with a die diameter of 1.2–1.3 mm will produce composite rods or fiber-resin intermediates (about 1.3 mm diameter) with about 50–60 wt % % fibre. 0.9 mm diameter rods with about 80–85 wt % fibre were also produced (as in Table 1) with similar approach. The use of a 2 mm die with a glass fibre feed of 5350 tex in total typically produce intermediates, with 70–90 wt % fibre content. Again adjustment of fibre feed tex and of die diameter can result in controllable variations of fibre content. These are only approximate guidelines and variations outside of these ranges can be experienced depending on the resin compositions and processing speeds, and other unknown factors. There are examples where low coating or resin contents (eg <10 wt %) are observed. In such cases the initial product prior to cutting or extruding or other treatment may sometimes be considered coated or impregnated tow or fibre bundle or tape rather than a well consolidated rod which can be fed into a continuous mixer or compounder, such as an extruder, or can be chopped directly.

'Direct' chopping would produce a thermoformable intermediate such as a pellet or granule, or a chopped impregnated fibre bundle, with long fibre lengths if desired, for subsequent processing (eg extrusion compounding and/or injection moulding).

Phenoxy ethyl acrylate (PEA, such as SR339 from Sartomer Co) has been found to be particularly useful for dissolving or dispersing certain polymers. This is illustrated in the examples of Table 3 onwards. Examples using other monomers are also shown.

Tensile and Izod Impact properties were measured according ASTM test methods D638 and D256 respectively.

TABLE 3

Resin-fibre intermediates prepared according to Example 1 with monofunctional polymerisable monomer present in the formulation and 2 parts photoinitiator.

| FORMULATION (PARTS BY WT) | ROD DIA (mm) | LINE SPEED (1 lamp) (m/min) | WT % MATRIX (NON-FIBRE) |
|---|---|---|---|
| PEA/ABS (85.5/12.5) | 1.3 | 7 | 43.9 |
| PEA/SAN (85.5/12.5) | 1.3 | 7 | 43.5 |
| PEA/PMMA (73/25) | 1.3 | 7 | 42.6 |
| PEA/PS (73/25) | 1.3 | 7 | 42.8 |
| PEA/PVC+ (93/5) | 1.3 | 7 | 43.3 |
| PEA/PET+ (85/13) | 1.3 | 10 | 43.5 |
| PEA/PS (70/28) | 0.9 | 15 | 15.1 |
| PEA/PC (93/5) | 0.9 | 9 | 17.4 |

TABLE 3-continued

Resin-fibre intermediates prepared according to Example 1 with monofunctional polymerisable monomer present in the formulation and 2 parts photoinitiator.

| FORMULATION (PARTS BY WT) | ROD DIA (mm) | LINE SPEED (1 lamp) (m/min) | WT % MATRIX (NON-FIBRE) |
|---|---|---|---|
| PEA/PS/ECR368LC (53/25/10) | 0.9 | 9 | 15.8 |
| NMVA/PVC (72.5/25) | 1.3 | 10 | 29.0 |
| NMVA/PES (73/25) | 0.9 | 10 | 6.9 |
| NVP/PEI (83/15) | 0.9 | 10 | 11.8 |
| NVP/PC (83/15) | 0.9 | 9 | 11.9 |
| PEA/HIPS (68/30) | 0.9 | 7 | 15.3 |
| PEA/HIPS/βCEA (58/30/10) | 0.9 | 7 | 17.1 |
| PEA/HIPS/βCEA/TRIGC (58/30/10/0.5) | 0.9 | 7 | 16.6 |
| PEA/HIPS/βCEA/TRIGB (58/30/10/0.5) | 0.9 | 7 | 16.1 |
| PEA/HIPS/MA (58/30/10) | 0.,9 | 7 | 15.3 |
| PEA/HIPS/MA/TRIGC (58/30/10/0.5) | 0.9 | 7 | 15.9 |
| PEA/HIPS/MA/TRIGB (58/30/10/0.5) | 0.9 | 7 | 15.7 |
| PEA/PS/βCEA/SMA (57/30/10/1) | 0.9 | 7 | 15.4 |
| PEA/SMA17352 (78/20) | 0.9 | 7 | 16.6 |
| PEA/SMA17352 (68/30) | 1.3 | 7 | 16.1 |
| PEA/EB210 (68/30) | 1.3 | 7 | 16.4 |
| PEA/MA (88/10) | 1.3 | 7 | 16.9 |
| PEA/PEMA/HIPS (34/34/30) | 0.9 | 2–3 | 13.5 |
| PEA/PPE (88/10) | 1.3 | 7 | 15.9 |
| IOA/EVA (83/15) | 1.3 | 7 | 16.6 |
| PEMA/HIPS (68/30) | 0.9 | 2–3 | 10.1 |
| PEA/NVP/PES (58/30/10) | 0.9 | 7 | 16.2 |
| PEA/ASA (83/15) | 2.0 | 7 | 20.1 |
| PEA/ZTA-N/EB3605 (39/39/20) | 0.9 | 7 | 16.4 |
| VEOVA-11/EVA (78/20) | 0.9 | 7 | 6.3 |
| PEA/EB3605 (78/20) | 0.9 | 7 | 16.5 |
|  | 2.0 | 7 | 21.4 |
| PEA/EOCN/PhP+ (68/15/15) | 0.9 | 7 | 15.9 |
| PEA/EB3605/EXL2314+ (68/20/10) | 0.9 | 7 | 47.6 |
| PEA/ABS (68/30) | 2.0 | 5 | 48.9 |
|  | 2.0 | 7 | 21.9 |
| PEA (98) | 1.3 | 7 | 41.5 |
|  | 0.9 | 9 | 17.3 |
|  | 2.0 | 11 | 20.9 |
| PEA (98): 2 lamps | 2.0 | 21 | 20.8 |

TABLE 4

Rods or fibre-resin intermediates prepared according to Example 1 with formulations containing multifunctional monomers, and 2 parts of benzil dimethyl ketal as photoinitiator.

| FORMULATION (PARTS BY WT) | ROD DIA (mm) | LINE SPEED (m/min) | WT % MATRIX (NON-FIBRE) |
|---|---|---|---|
| PEA/TPGDA/PS (58.4/14.6/25) | 0.9 | 10 | 16.0 |
| PEA/TPGDA/SAN (68.4/17.1/12.5) | 0.9 | 10 | 16.5 |
| PEA/TPGDA/PMMA (43.8/29.2/25) | 0.9 | 10 | 15.6 |
| PEA/PS/HDDA (57/30/11) | 0.9 | 12–13 | 13.4 |
| PEA/PS/HDDA (34/30/34) | 0.9 | 12–13 | 13.2 |
| HDDA/βCEA/AMPP+ (18/70/10) | 0.9 | 12–13 | 5.2 |
| PEA/TR2500 (96/2) | 2.0 | 7 | 20.6 |
|  | 2.0 | 15–16 | 20.4 |
|  | 0.9 | 7 | 15.8 |
| PEA/TR2500/EB3605 (76/2/20) | 0.9 | 7 | 15.1 |
| IOA/HDDA/CN300/MA/TRIGB (37.5/10/40/10/0.5) | 0.9 | 10 | 23.2 |
| PEA/MAPB/VTBN/MA/TRIG-C (68/11/11/7/1) | 0.9 | 7 | 14.1 |
| MODAR 835 (98) | 2.0 | 8 | 15.1 |
|  | 0.9 | 10 | 10.6 |
| EA/TPGDA/EOEOEA/PP+ (49/44.1/4.9/5) | 1.3 | 7 | 45.5 |
| EA/TPGDA/EOEOEA/UHMWPE+ (49/44.1/4.9/5) | 1.3 | 7 | 44.1 |
| EA/TPGDA/EOEOEA/PTFE+ (49/44.1/4.9/5) | 1.3 | 7 | 42.8 |
| EA/TPGDA/EOEOEA/PA+ (49/44.1/4.9/5) | 1.3 | 7 | 45.8 |

+dispersion.

Notes To Tables 3 and 4
All polymers were either dissolved (usually in a monofunctional monomer first, if present), or dispersed (using powdered polymer), in the radiation curable component(s).
ABS = Acrylonitrile butadiene styrene.
SAN = Styrene-acrylonitrile.
PVC = polyvinylchloride.
PS = polystyrene.
HIPS = high impact polystyrene.
PMMA = polymethylmethacrylate.
PC = polycarbonate.
PES = polyethersulphone (Victex/ICI).
PEI = polyetherimide (Ultem, GE Plastics).
PET = polyethylene terephthalate (Aldrich Chemicals).
PA = polyamide 12 (Orgasol, Elf Atochem).
PP = polypropylene.
UHMWPE = ultra high molecular weight polyethylene.
PTFE = polytetrafluoroethylene.
AMPF = acid modified/functional polypropylene (eg copolymer of acrylic acid or maleic anhydride with propylene).
PPE = polyphenylene ether or polyphenylene oxide
PEMA = phenoxy ethyl methacrylate.
EB210 = Ebecryl 210, an acrylated urethane oligomer (urethane-acrylate).
SMA = styrene-maleic anhydride copolymer.
SMA17352 = styrene maleic anhydride half ester (Elf Atochem).
TRIG C = Trigonox C, a peroxide (Akzo).
TRIG B = Trigonox B, a peroxide (Akzo).
ASA-Acrylonitrile-styrene- acrylate polymer, eg Luran grades from BASF.
EXL 2314 = core shell impact modifiers, powder grades (Rohm & Haas)
TR2500 = silicone diacrylate (or acrylated polydiemthylsiloxane); Tego Rad 2500, Goldschmidt)
ZTA-N = Zonyl- TA-N a fluorinated acrylate (DuPont).
PhP = Phenolic resin powder.
EOCN = epoxy cresol novolak resin (Ciba).
ECR368LC = hydrocarbon tackifying resin (Exxon).
EA = epoxy acrylate oligomer (acrylated bisphenol-A epoxy resin such as CN104 (Cray Valley).

TABLE 4-continued

Rods or fibre-resin intermediates prepared according to Example 1 with formulations containing multifunctional monomers, and 2 parts of benzil dimethyl ketal as photoinitiator.

MAPB = Maleinised polybutadiene (Lithene 10MA; a liquid rubber from Revertex).
VTBN = Vinyl (methacrylate) terminated acrylonitrile-butadiene liquid rubber (Hycar from BF Goodrich).
EB3605 = Ebecryl 3605, a half acrylated derivative of bisphenol-A epoxy resin containing on average about 1 acrylate group and 1 epoxy group per molecule (UCB Chemicals).
Modar = urethane methacrylate composition (originally ICI - now Ashland Polymers).

EXAMPLES

Table 5

Table 5 shows examples of some formulations which have been UV pultruded (with glass fibre), according to a process similar to that described in Example 1, which contain polymer and/or monomers or other additives which may contribute to fire retardant properties and/or which contain added inorganic fillers. Some of these are unreactive liquids (eg RDP),co-reactive liquids (PHDMA) or low melting solids (TPP). In some cases the fire retardant may be largely encapsulated within the UV cured matrix and hence migration may be reduced.

TABLE 5

UV pultruded glass reinforced fibre intermediates, ~0.9 mm diameter unless otherwise stated, prepared from compositions containing examples of fillers or flame retardant additives using one UV lamp at about 7–11 m/min.

| FORMULATION (PARTS BY WEIGHT) | WT % MATRIX (NON-FIBRE) |
|---|---|
| PEA/BC52/PI (49/49/2) | 20.9 |
| PEA/BC52/CN104/PI (46.5/46.5/5/2) | 20.7 |
| PEA/βCEA/CN104TPP/PI (16/16/16/48/2) | 20.5 |
| PEA/HPA/CN104/TPP/PI (16/16/16/48/2) | 20.3 |
| PEA/βCEA/RDP/PI (16/16/16/48/2) | 19.8 |
| PHDMA/PI (98/2) | 16.5 |
| PHDMA/PI/BPO (98/1/1) | 16.9 |
| MODAR836/TP/PI (48/50/2) | 16.3 |
| PEA/βCEA/TPP/PI (28/20/50/2) | 17.0 |
| PEA/TPP/PI (42/57/1) Lower Vf*** | 42 |
| TPGDA/TPP/PI (42/57/1) Lower Vf*** | 38 |
| MODAR 836/ATH/CQ/TEA (63/32/2/3) Lower Vf*** | 48.6 |
| MODAR/TPP/KAOLIN/PI (45/39/14/2) | 47.6 |
| PPZ/IRG184 (100/3) | 10.8 |
| PEA/EB3605/MICA/PI (68/20/10/2) Lower Vf*** | 49.5 |

BC52 = brominated low molecular weight polycarbonate oligomer (Great Lakes).
PI = benzil dimethyl ketal photoinitiator.

TABLE 5-continued

UV pultruded glass reinforced fibre intermediates, ~0.9 mm diameter unless otherwise stated, prepared from compositions containing examples of fillers or flame retardant additives using one UV lamp at about 7–11 m/min.

| FORMULATION (PARTS BY WEIGHT) | WT % MATRIX (NON-FIBRE) |
|---|---|

TPP = triphenyl phosphate.
HPA = hydroxy propyl acrylate.
RDP = oligomeric aryl phosphate (Akzo).
PHDMA = phosphate dimethacrylate (Albright & Wilson).
BPO = benzoyl peroxide.
ATH = aluminium oxide trihydrate.
PPZ = phosphazene methacrylate oligomer (Idemitsu).
IRG 184 - Irgacure 184 photoinitiator (Ciba).
CQ = camphorquinone.
TEA = triethanolamine.
***reduced number of fibre tows (by half) and speed of 2–3 m/min with one lamp.

EXAMPLES

Table 6

Resin-fibre intermediates using continuous carbon fibres produced according to the method of previous examples, using impregnation bath temperatures in the range 60–80° C., are shown in the table below. The approximate diameter of the radiation polymerised product was ~0.9 mm. Examples of radical (eg initiated by benzil dimethyl ketal, BDK), and cationic (eg initiated by UVI-6974) polymerisation systems are shown and mixtures of different radiation polymerisation systems could also be used to produce a dual cured system, if desired. Such formulations could also be applied to glass or other fibres, if desired.

| FORMULATION (PARTS BY WT) | LINE SPEED (1 lamp) (m/min) | WT % MATRIX (NON-FIBRE) |
|---|---|---|
| PEA/ABS/BDK (98/20/2) | 11 | 5.1 |
| PEA/EB3605/DGEBA/CTBN/VTBN/BDK (30/20/20/14/14/2) | 11 | 10.5 |
| HBVE/UVI-6974 (94/6) | 7 | 3.6 |
| HBVE/AN139/UVI-6974 (85/9/6) | 7 | 4.6 |
| DGEBA/CCE/ERL4221/PCT/UVI-6974 (54/15/10/15/6) | 7 | 8.8 |

HBVE = hydroxy butyl vinyl ether (Rapicure, from ISP Chemicals).
DGEBA = bisphenol A epoxy resin, in this case a mixture of a relatively higher molecular weight, solid grade with a liquid grade, although any grade of bisphenol-A epoxy resin could be used providing it is a liquid or is miscible or dissolvable or dispersible in the other components. Other epoxy resins such as bisphenol-F, epoxy novolaks or derivatives of epoxy resins could be used.
ERL 4221 = cycloaliphatic diepoxide (Union Carbide).
CTBN = carboxy terminated liquid rubber (acrylonitrile-butadiene; Hycar CTBN from BF Goodrich).
AN139 = polyvinyl methyl ether- maleic anhydride copolymer (Gantrez AN 139, from ISP).
PCT - polycarprolactone triol ('Tone Polyol' from Union Carbide).
CGE = cresyl glycidyl ether.

EXAMPLES

Tables 7, 8, 9, 10 and 11

Tables 7, 8, 9, 10 and 11 show examples of the use of fibre reinforced intermediates or rods, or coated fibres, prepared by V-pultrusion or UV-fibre pre-impregnation as feedstock in compounding. Either cut or uncut product may be used, although in these examples it was the uncut products which were fed directly into a continuous mixer such as an extruder, for mixing, with added polymer(s) and/or other materials, to produce thermoformable intermediates or mouldable pellets. This is a useful approach for utilising higher fibre content products of the radiation induced polymerisation/impregnation process, such as those containing more than 50 wt % fibre and more usually between 60–95 wt % fibre, and, in particular, products with more than 70 wt %, 75 wt %, 80 wt %, 85 wt % or 90 wt % fibre contents, particularly when rubbery or tacky intermediate products which may be less easy to cut or chop after the radiation induced polymerisation processing stage. Such pellets, or indeed the extrudate, could also be extrusion compounded (in a second extrusion stage), with other additives and/or added polymer(s) to produce further pellets with reduced fibre contents, as desired, suitable for injection moulding.

The UV cured rods or UV pre-impregnated fibres can be fed into an extruder or other continuous mixer at the hopper end (where polymer is usually added) or at a port hole near the exit die, or indeed at any port in between. More than one feed position or port can be used simultaneously. Control of fibre weight or volume fractions in the extrudate can be achieved by variations in, for example, screw speed (which controls rod or coated fibre feed speed), the number, diameter, and fibre content of the rod or coated fibre feed, and the rate of delivery of polymer/other additive(s) feed. Suitable gravimetric or volumetric feeding equipment, as known in the extrusion industry can be used.

As is known in the art the use of certain screw designs or configurations or of distributive based mixers can reduce fibre degradation during mixing or compounding. In addition, alignment and extrudate quality can be controlled by optimised cooling methods and/or adapters or fixtures such as breaker plates.

The initial rods or pre-coated fibres produced in these examples could be chopped into any desired leg and injection moulded, if desired, with or without added polymers/additives. However, in these experimental examples the product of the radiation pre-coating or pultrusion process was continuously fed into a twin screw compounding extruder (Prism 16 TSE model Laboratory Extruder) with added polystyrene (PS; Huntsman Crystal grade) and then extruded (barrel temperatures around 240° C.) with on-line chopping to yield 3 mm pellets suitable for injection moulding. Ratioing of the feeds into the extruder was arranged to produce pellets with about 20 wt %) fibre in these examples. Similar glass fibre (GF) contents were achieved for the injection mouldable pellets as for the extruded pellets, and were determined by burn-off at 600° C.

Injection moulding was carried out on a Boy 22E machine with melt temperature of 240° C. and a mould temperature of 40° C.

Table 7 shows a particular composition of PEA/PS/PI (70/27.5/2.5; PI=benzil dimethyl ketal) and also other examples which were performed by UV-pultruding glass fibres through a heated bath of mixtures of PS (polystyrene) and PEA (30/70 PS/PEA ratio by weight), with and without added HDDA (as a crosslinking agent; PS/PEA/HDDA at a ratio of 30/35/35) according to the procedures described above, with photoinitiator present. A comparative example using uncoated equivalent glass fibre is also shown and in this case a greater impact strength was show for the coated fibres. Such impregnated fibres (about 80–85 wt % glass; relatively soft resin impregnation without HDDA present and relatively 'hard' resin impregnation with HDDA present) were then fed directly into the twin screw extruder, as above, and compounded with added PS to produce mouldable pellets. Injection moulding produced glass reinforced composites with the following impact properties;

TABLE 7

Injection moulded samples prepared from UV pultruded rod (coated fibres) fed directly into an extruder - compared with uncoated fibre.

| UV-POLYMERISED ROD PRODUCT COMPOSITION | EXTRUDED PELLET COMPOSITION | INJECTION MOULDED NOTCHED IMPACT STRENGTH ASTM D256 KJ/m² |
|---|---|---|
| 200 total tex GF + PEA/PS (GF @ 80 wt %) | GF(80 wt %)/PEA/PS (UV-pultruded) + PS –> GF @ 21.1 wt % | 2.4 |
| 2200 total tex GF (uncoated) | GF + PS –> GF @ 22.3 wt % | 2.0 |
| 2200 total tex GF + PEA/PS coating (GF @ ~80–85 wt %) | GF/PEA/PS (UV-pultruded) + PS –> GF @ ~17 wt % | 2.3 |
| 2200 total tex GF + PEA/HDDA/PS (GF @ ~80–85 wt %) | GF/PEA/HDDA/PS (UV-pultruded) + PS –> GF @ ~17 wt % | 2.1 |

*after injection moulding at 240° C. (melt) and mould temperature of 40° C. Fibres lengths 10–25 mm long were easily observed in extrudates, as well as shorter fibre lengths.

The use of such a process to pre-impregnate fibres via radiation pultrusion (or to produce radiation pultruded rods/bundles) prior to extrusion and/or injection moulding may reduce screw or barrel wear in such equipment.

Table 8

In these examples carbon fibre (CF) tow which was continuously impregnated with a radiation polymerisable composition (see Table 6) and exposed to UV radiation, as in previous examples, to produce a resin impregnated tow intermediate which was subsequently fed into the twin screw extruder, as described above, together with added nylon 6. The chopped extrudate (9 mm pellets) was dried (severs hours at 80° C.) and injection moulded with a melt temperature (in barrel) of 260–270° C. and a mould temperature of 110° C. to produce moulded composites with the following properties:

TABLE 8

| UV polymerised fibre-resin product | Extruded Pellet Compositions: Materials into Extruder = Nylon 6 pellets + (UV polymerised rod/coated fibres) | Tensile Modulus (GPa) | Tensile Strength (MPa) | Izod Impact (kJ/m²) (notched) | % wt CF in extrudate/moulding |
|---|---|---|---|---|---|
| CF tow + (PEA/ABS/PI 78/20/2) | Nylon 6 (~52 parts by wt) + CF/PEA/ABS/PI (~95% CF: 5% resin) (10 parts by wt) | 16.5 | 159 | 3.7 | ~15 |

TABLE 9

Table 9 shows examples of the use of UV pultruded continuous glass fibre rod or UV precoated continuous glass fibres, prepared according to the invention, using various UV curable impregnating formulations (from Tables 1–5). The rods or tapes or coated fibres were fed into a twin screw extruder with simultaneous feed of HIPS (high impact polystyrene) and then extrudates were chopped (to about 3 mm lengths) to produce a pellet of 15–20 wt % glass fibre content (approximately). Such pellets were injection moulded in a Boy 22E machine with a melt temperature of about 220° C. and a mould temperature of about 80° C. to give properties as below. In the final mouldings of these examples, the UV coating formulation is present at about 3 wt %.

| Extruded Pellet Composition: Materials into Extruder = Polymer pellets + (UV polymerised rod/coated fibres) | Tensile Modulus (GPa) | Tensile Strength (MPa) | Izod Impact (kJ/m²) unnotched | Izod Impact (kJ/m²) notched | % wt GF in extrudate | % wt GF in moulding |
|---|---|---|---|---|---|---|
| HIPS/dGF* (EC13, P368) | 4.82 | 26.4 | 10.1 | 4.81 | 15.8 | 16.7 |
| HIP/dGF* (EC10, 5252) | 4.70 | 27.2 | 8.69 | 4.78 | 16.0 | 15.8 |
| HIPS + (PEA/HIPS/GF) | 5.20 | 34.6 | 9.34 | 5.95 | 16.5 | 16.6 |
| HIPS + (PEA/HIPS/βCEA/GF) | 5.14 | 32.2 | 10.3 | 5.55 | 15.3 | 15.0 |
| HIPS + (PEA/HIPS/MA/GF) | 5.31 | 36.5 | 10.1 | 5.75 | 15.9 | 15.8 |

TABLE 9-continued

Table 9 shows examples of the use of UV pultruded continuous glass fibre rod or UV precoated continuous glass fibres, prepared according to the invention, using various UV curable impregnating formulations (from Tables 1–5). The rods or tapes or coated fibres were fed into a twin screw extruder with simultaneous feed of HIPS (high impact polystyrene) and then extrudates were chopped (to about 3 mm lengths) to produce a pellet of 15–20 wt % glass fibre content (approximately). Such pellets were injection moulded in a Boy 22E machine with a melt temperature of about 220° C. and a mould temperature of about 80° C. to give properties as below. In the final mouldings of these examples, the UV coating formulation is present at about 3 wt %.

| Extruded Pellet Composition: Materials into Extruder = Polymer pellets + (UV polymerised rod/coated fibres) | Tensile Modulus (GPa) | Tensile Strength (MPa) | Izod Impact (kJ/m$^2$) unnotched | Izod Impact (kJ/m$^2$) notched | % wt GF in extrudate | % wt GF in moulding |
|---|---|---|---|---|---|---|
| HIPS + (PEA/HIPS/MA/TRIGC-0.5%-/GF) | 5.37 | 36.4 | 11.3 | 5.84 | 15.4 | 15.9 |
| HIPS + (PEA/HIPS/MA/TRIGB-0.5%-/GF) | 5.47 | 36.5 | 11.0 | 6.04 | 15.4 | 15.7 |

*reference compositions using pellets prepared from conventional extruded mixtues of chopped fibres (dGF = commercial discontinuous or chopped glass fibre; grades as noted in the Table, from Vetrotex) and matrix polymers.

Table 10

Table 10 shows examples of the use of UV pultruded continuous glass fibre rods or UV precoated continuous glass fibres which were prepared according to the invention, using various UV curable impregnating formulations (selected from Tables 1–5). The rods or tapes or coated fibres were fed into a twin screw extruder with simultaneous feed of HIPS (high impact polystyrene) and the extrudates were chopped (to about 9 mm lengths) to produce a pellet of 15–20 wt % glass fibre content (approximately). Higher or lower final fibre contents can easily be achieved by simple alteration of mixing ratios. Such pellets were then injection moulded in a Boy 22E machine with a melt temperature of about 220° C. and a mould temperature of about 80° C. to give moulded properties as below. In the final mouldings of these examples, the UV coating formulation will account for about 2–5% of the weight.

TABLE 10

| Extruded Pellet Composition: Materials into Extruder = Polymer pellets + (UV polymerised rod/coated fibres) | Tensile Modulus (GPa) | Tensile Strength (MPa) | Izod Impact (kJ/m$^2$) unnotched | Izod Impact (kJ/m$^2$) notched | % wt GF in extrudate | % wt GF in moulding |
|---|---|---|---|---|---|---|
| HIPS/dGF* (EC13 P368) | 4.73 | 27.6 | 9.56 | 4.97 | 16.8 | 16.9 |
| HIPS/dGF* (EC10 5252) | 4.93 | 29.5 | 9.16 | 5.15 | 16.6 | 16.7 |
| HIPS + PEA/HIPS/GF) | 5.10 | 33.0 | 9.33 | 5.58 | 16.4 | 16.4 |
| HIPS + (PEMA/HIPS/GF) | 6.92 | 42.4 | 11.0 | 3.48 | 22.5 | 22.9 |
| HIPS + (PEA/PEMA/HIPS/GF) | 6.66 | 41.3 | 8.60 | 4.24 | 21.3 | 21.6 |
| HIPS + (PEA/HIPS/MA/GF) | 5.53 | 37.2 | 7.88 | 4.00 | 16.7 | 17.2 |
| HIPS + (PEA/HIPS/MA/TRIGB-2%-/GF) | 5.19 | 35.4 | 8.02 | 4.98 | 16.6 | 15.7 |
| HIPS + (PEA/PEMA/HIPS/MA/TRIBG-2%-/GF) | 6.26 | 41.8 | 7.32 | 3.81 | 19.5 | 19.3 |
| HIPS + (PEA/SMA/GF) | 5.27 | 34.0 | 10.3 | 5.32 | 16.5 | 16.8 |

*reference compositions using pellets prepared from conventional extruded mixtures of chopped fibres (dGF = discontinuous glass fibre grades from Vetrotex; 4.5 mm typical length) and matrix polymers.

Table 11

Table 11 shows examples of the use of UV pultruded or pre-impregnated continuous glass fibre resin intermediates, which were prepared according to the invention using various UV curable impregnating formulations (selected from Tables 1–5). The rods or tapes or coated fibres were fed into a twin screw extruder with simultaneous feed of added polymers and/or other additives and the extrudates were then chopped (to about 9 mm lengths) to produce in these case except where stated otherwise, pellets of 10–25 wt % glass fibre content (approximately). Higher or lower final fibre contents can easily be achieved by simple alteration of mixing ratios. Such pellets were then injection moulded in a Boy 22E machine under conditions within the usual range recommended for the dominant matrix (added) polymer. Injection moulded samples exhibited the properties show below.

TABLE 11

| Extruded Pellet Composition:<br>Materials into Extruder =<br>Polymer pellets +<br>(UV polymerised rod/coated fibres) | Tensile<br>Modulus<br>(GPa) | Tensile<br>Strength<br>(MPa) | Izod<br>Impact<br>($kJ/m^2$)<br>(notched) | % wt GF in<br>extrudate/<br>moulding |
|---|---|---|---|---|
| PP/dGF (EC13 P368)* | 4.20 | 55.5 | 3.87 | 19.9 |
| PP +<br>(IOA/238/CN300/TRIG-B) | 4.46 | 52.7 | 5.93 | 19.9 |
| PP + dGF (EC13 P368)** +<br>(IOA/238/CN300/TRIG-B) | 6.47 | 60.0 | 4.59 | 30.2 |
| PE +<br>(VEOVA-11/EVA) | 4.89 | 32 | 4.37 | 19.7 |
| PA6/dGF (EC10 P327)* | 6.33 | 121 | 3.6 | 19.6 |
| PA6 +<br>(MODAR835) | 6.08 | 104 | 5.19 | 18 |
| PA6 +<br>(PEA/EB3605) | 6.38 | 117 | 6.21 | 18.4 |
| PA6 +<br>(PEA/EB3605/TR2500) | 6.92 | 123 | 6.22 | 20.7 |
| PA6 +<br>(PEA/NVP/PES) | 5.54 | 96.4 | 5.69 | 15 |
| PA6 +<br>(PEA/EB3605/Z-TAN) | 6.94 | 125 | 6.47 | 20.6 |
| PA6 +<br>(PEA/MAPB/VTBN/MA/TRIG-C) | 8.75 | 136 | 7.7 | 29.5 |
| PA6 +<br>(PEA/EB3605/EXL2314) | 5.1 | 82 | 5.8 | 18.0 |
| PC-ABS-2/dGF (EC10 5252)* | 5.38 | 71.7 | 4.52 | 19.9 |

| Extruded Pellet Composition:<br>Materials into Extruder =<br>Polymer pellets +<br>(UV polymerised rod/coated fibres) | Tensile<br>Modulus<br>(GPa) | Tensile<br>Strength<br>(MPa) | Izod<br>Impact<br>($kJ/m^2$)<br>(notched) | % wt GF in<br>extrudate/<br>moulding |
|---|---|---|---|---|
| PC-ABS-2 +<br>(PEA/EB3605/MICA) | 6.5 | 68.3 | 3.29 | 30.0*** |
| PC-ABS-2 +<br>(PEA/TR2500) | 6.28 | 73.6 | 5.48 | 21.2 |
| PC/dGF (EC10 5252)* | 5.31 | 96.1 | 7.87 | 19.8 |
| PC +<br>(PEA/EB3605/MICA) | 7.47 | 94.2 | 4.8 | 29.6*** |
| PC +<br>(PEA/MAPB/VTBN/MA/TRIG-C) | 7.64 | 98.0 | 4.22 | 27.1 |
| PBT/dGF (EC10 5252)* | 6.03 | 85.7 | 2.50 | 19.0 |
| PBT +<br>(PEA/TR25) | 5.83 | 81.6 | 4.01 | 16 |
| PBT +<br>(PEA/EB3605) | 6.10 | 96.4 | 4.31 | 16.3 |

*reference compositions using pellets prepared from conventional extruded mixtures of chopped fibres (dGF = discontinuous glass fibre grades from Vetrotex; 4.5 mm typical length) and matrix polymers.
**example where, in addition to polymer (matrix) pellets being mixed with the fibre-resin product of the radiation polymerisation, short chopped fibres were also added into the extruder.
***includes mica (filler) content.
(RC-ABS-2 = 50% PC and 50% ABS).

EXAMPLES

Table 12

Table 12 shows examples of the use of pelletised or chopped rods or tapes or impregnated fibre bundles, prepared according to the invention from continuous fibres, and used as feedstock for injection moulding. The products of the radiation induced polymerisation stage using various impregnation formulations,, selected from the examples shown in Tables 1–5, were chopped to about 9 mm lengths and injection moulded with added polymer in these examples. This is a useful approach for utilising the chopped or pelletised higher fibre content products of the radiation induced polymerisation/impregnation process, such as those containing more than 50 wt % fibre and more usually between 60–95 wt % fibre content and in particular products with more than 70 wt %, 75 wt %, 80 wt %, 85 wt % or 90 wt % fibre contents, after the radiation induced polymerisation processing stage. Unless otherwise stated, 0.9 mm diameter pellets were used. Photoinitiator was also present in the impregnation formulations, as indicated in Tables 1–5. Injection moulding conditions were varied within those usually recommended for the added, dominant matrix polymers.

TABLE 12

| Materials into Moulding Machine = Polymer Pellets + (fibre-resin pellets from UV polymerisation) | Tensile Modulus (GPa) | Tensile Strength (MPa) | Izod Impact (kJ/m$^2$) (notched) | % wt GF in moulding |
|---|---|---|---|---|
| ABS/dGF (EC10 5252)* | 5.20 | 63.5 | 4.46 | 20.0 |
| ABS + (PEA/GF: 0.9 mm dia. pellets | 5.90 | 70.5 | 11.4 | 20.2 |
| 2 mm dia. pellets) | 5.50 | 72.8 | 11.7 | 21.0 |
| ABS + (PEA/ABS/GF) | 5.33 | 70.3 | 10.7 | 21.5 |
| PC-ABS-1/dGF(EC10 5252)* | 5.90 | 75.9 | 3.28 | 25.1 |
| PC/ABS-1 + (PEA/GF) | 6.65 | 68.9 | 6.44 | 20.4 |
| PC/ABS-1 + (PEA/SMA/GF) | 6.97 | 75.1 | 5.29 | 20.6 |
| PC/ABS-1 + (PEA/ABS/GF) | 6.86 | 71.2 | 4.59 | 21.9 |
| PC-ABS-2/dGF(EC10 5252)* | 5.38 | 71.7 | 4.52 | 19.9 |
| PC-ABS-2 + (PEA/TR25: 2 mm dia. pellets) | 4.95 | 59.4 | 8.47 | 20.7 |
| PP/dGF (EC13 P368)* | 4.20 | 55.5 | 3.87 | 19.9 |
| PP + (PEA/MA/GF) | 4.07 | 43.6 | 7.94 | 18.1 |
| PP + (IOA/EVA/GF) | 4.78 | 33.8 | 10.8 | 18.1 |
| PE + (PEA/MA/GF) | 3.86 | 24.9 | 4.94 | 20.1 |
| ASA/dGF (EC10 5252)* | 6.06 | 62.7 | 3.12 | 21.4 |
| ASA + (PEA/GF) | 6.19 | 65.0 | 7.88 | 22.6 |
| ASA + (PEA/ABS/GF) | 5.82 | 66.6 | 8.31 | 20.9 |
| ASA + (PEA/ASA: 2 mm pellets) | 6.76 | 63.8 | 11.3 | 22.9 |
| PC/dGF (EC10 5252)* | 5.31 | 96.1 | 7.87 | 19.8 |
| PC + (PEA/PMMA/GF) | 6.60 | 92.6 | 8.02 | 20.2 |
| PC + (PEA/ABS/GF) | 6.52 | 89.5 | 8.22 | 20.0 |
| PC + (PEA/ASA: 2 mm pellets) | 7.1 | 101 | 10.7 | 18.9 |
| PA6/dGF (EC10 P327)* | 6.33 | 121 | 3.6 | 19.6 |
| PA6 + (PEA/UA/GF) | 6.45 | 96.1 | 14.1 | 21.8 |
| PA6 + (PEA/ABS: 2 mm pellets) | 6.50 | 110 | 10.7 | 22.5 |
| PA6 + (Modar835: 2 mm pellets) | 6.35 | 94.5 | 12.67 | 22.1 |
| PA6 + (PEA/EB3605: 2 mm pellets) | 4.51 | 62.7 | 9.14 | 21.4 |
| PA6 + (PEA/MA/GF) | 6.43 | 115 | 8.07 | 20.8 |
| PBT/dGF (EC10 5252)* | 6.03 | 85.7 | 2.5 | 19.0 |
| PBT + (PEA/GF) | 6.56 | 88.7 | 11.6 | 20.1 |
| PBT + (PEA/SMA/GF) | 7.0 | 83.9 | 10.5 | 20.3 |
| PBT + (PEA/ASA: 2 mm pellets) | 6.82 | 101 | 11.4 | 20.7 |
| PET/dGF (EC10 5252)* | 5.54 | 85.3 | 2.3 | 18.7 |

TABLE 12-continued

| Materials into Moulding Machine = Polymer Pellets + (fibre-resin pellets from UV polymerisation) | Tensile Modulus (GPa) | Tensile Strength (MPa) | Izod Impact (kJ/m$^2$) (notched) | % wt GF in moulding |
|---|---|---|---|---|
| PET + (PEA/GF) | 6.87 | 103.1 | 12.4 | 20.2 |

*reference compositions using pellets prepared from conventional extruded mixtures of chopped fibres (dGF = discontinuous glass fibre; 4.5 mm length) and matrix polymers.
(PC-ABS-1 = flame retarded grade with PC as dominant polymer.
PC-ABS-2 = 50% PC with 50% ABS.)

The priority document of the present application, United Kingdom Patent Application No. 96 15995.9, filed Jul. 30, 1996, is hereby incorporated by reference.

We claim:

1. A process for the manufacture of fibre-reinforced intermediates useful in thermoplastic processing methods, which comprises impregnating continuous fibres with a resin composition comprising at least one radiation-polymerisable component; exposing the impregnated fibres to radiation to effect polymerisation of such component; and cutting the product to form thermoplastically processible intermediates.

2. A process according to claim 1, further including a moulding or compounding step in which the cut product is mixed with at least one polymer and/or other additive.

3. A process according to claim 2, in which the cut product is mixed with at least one polymer and/or other additive in an extruder, and the extrudate is cut to form thermoplastically processible intermediates.

4. A process for he manufacture of fibre-reinforce intermediates useful in thermoplastic processing methods, which comprises impregnating continuous fibres with a resin composition comprising at least one radiation-polymerisable component; blending the uncut product with at least one polymer and/or additive in a continuous mixer such as an extruder; and cutting the resulting blended product to form thermoplastically processible intermediates.

5. A process according to claim 2, in which at least one added polymer is a thermoplastic polymer or a thermoplastic elastomer or is an elastomer or rubber or other polymer processible by thermoplastic moulding or compounding methods.

6. A process according to claim 1, in which the thermoplastically processible intermediates are suitable for compounding or injection moulding.

7. A process according to claim 1, in which the fibres are reinforcing fibres including glass, carbon, cellulosic or polymeric fibres.

8. A process according to claim 1, in which the impregnated fibres are pulled through at least one die in a pultrusion process and exposed to radiation after passing through the die.

9. A process according to claim 1, in which the radiation-polymerisable component(s) is polymerisable under the effect of ultraviolet (UV) and/or visible radiation.

10. A process according to claim 1, in which the radiation-polymerisable component comprises at least one monofunctional polymerisable monomer.

11. A process according to claim 1, in which the radiation-polymerisable component comprises a difunctional and/or multifunctional polymerisable monomer or oligomer.

12. A process according to claim 1, in which the radiation polymerisable component(s) comprises acrylate and/or methacrylate, and/or are polymerisable by cationic initiation.

13. A process according to claim 1, in which the resin composition contains a thermal radical initiator.

14. A process according to claim 1, in which the resin composition includes a photoinitiator.

15. A process according to claim 1, in which the resin composition contains at least one polymer or resin, which is a solid, semi-solid or liquid, and which is dissolved or dispersed in the radiation polymerisable component(s).

16. A process according to claim 15, in which the polymer is an elastomer or rubber or a thermoplastic polymer or a thermoplastic elastomer (TPE).

17. A process according to any of claim 1, in which one or more components of the impregnation formulation bear reactive functionality(ies) selected from carboxylic acid, sulfonic acid, acid anhydride, epoxide, hydroxyl, phenolic, amine and units of unsaturation.

18. A process according to claim 1, where the fibre content after radiation polymerisation is 50 wt % or more.

19. A process according to claim 4, in which the fibres are reinforcing fibres including glass, carbon, cellulosic or polymeric fibres.

20. A process according to claim 4, in which one or more components of the impregnation formulation bear reactive functionality(ies) selected from carboxylic acid, sulfonic acid, acid anhydride, epoxide, hydroxyl, phenolic, amine and units of unsaturation.

* * * * *